(12) United States Patent  
Battenberg (10) Patent No.: US 11,656,205 B2  
(45) Date of Patent: May 23, 2023

(54) METHOD FOR TESTING OF A WELD, AND ULTRASONIC PROBE ARRANGEMENT

(71) Applicant: BATTENBERG ROBOTIC GMBH & CO. KG, Marburg (DE)

(72) Inventor: Günther Battenberg, Marburg (DE)

(73) Assignee: BATTENBERG ROBOTIC GMBH & CO. KG, Marburg (DE)

( * ) Notice: Subject to any disclaimer, the term of this patent is extended or adjusted under 35 U.S.C. 154(b) by 568 days.

(21) Appl. No.: 16/798,582

(22) Filed: Feb. 24, 2020

(65) Prior Publication Data

US 2020/0271627 A1     Aug. 27, 2020

(30) Foreign Application Priority Data

Feb. 25, 2019    (DE) ..................... 10 2019 104 654.8  
Jan. 16, 2020    (DE) ..................... 20 2020 100 206.6

(51) Int. Cl.  
     *G01N 29/265*      (2006.01)  
     *B23K 31/12*      (2006.01)  
     (Continued)

(52) U.S. Cl.  
     CPC ......... *G01N 29/265* (2013.01); *B23K 31/125* (2013.01); *B25J 9/1633* (2013.01);  
     (Continued)

(58) Field of Classification Search  
     CPC ..... B23K 11/16; B23K 11/0026; B23K 11/11; B23K 31/125; B23K 2101/18;  
     (Continued)

(56) References Cited

U.S. PATENT DOCUMENTS

| 4,472,204 A | 9/1984 | Fischbach |
| 4,796,200 A * | 1/1989 | Pryor ..................... B25J 19/023 |
| | | 901/7 |

(Continued)

FOREIGN PATENT DOCUMENTS

| DE | 101 25 782 A1 | 3/2003 |
| DE | 10 2004 044 342 A1 | 10/2005 |

(Continued)

OTHER PUBLICATIONS

German Office Action dated Sep. 30, 2019, corresponding to German Application No. 10 2019 104 654.8.

(Continued)

*Primary Examiner* — Jacques M Saint Surin  
(74) *Attorney, Agent, or Firm* — Ladas & Parry LLP; Malcolm J. MacDonald, Esq.

(57) ABSTRACT

A method and arrangement for testing and/or correction of a weld (34, 36, 38) of a test object (26, 102), including alignment of an ultrasonic probe (16, 128) guided by a robot (100) on a target position of the weld (28, 30, 32), determination of the actual position (34, 36, 38) of the weld by means of an optical sensor (22, 130) and alignment of the ultrasonic probe (16) on the actual position, and measurement of the weld, where CAD data of the target position of the weld (28, 30, 32) is made available, on the basis of the CAD data of the weld the ultrasonic probe (16, 128) is aligned on the target position of the weld, and the ultrasonic probe is placed on the weld with controlled force after determination of the actual position (34, 36, 38) of the weld by means of the optical sensor (22, 130).

24 Claims, 7 Drawing Sheets

(51) Int. Cl.
    *B25J 9/16*         (2006.01)
    *B25J 19/02*      (2006.01)
    *G01B 11/00*     (2006.01)
    *G01L 5/00*       (2006.01)
    *G01N 29/04*     (2006.01)
    *G01N 29/24*     (2006.01)
    *G02B 27/28*     (2006.01)
    *B23K 101/00*    (2006.01)

(52) U.S. Cl.
CPC ........... B25J 9/1664 (2013.01); B25J 9/1666 (2013.01); B25J 9/1671 (2013.01); B25J 9/1682 (2013.01); B25J 9/1697 (2013.01); B25J 19/023 (2013.01); G01B 11/005 (2013.01); G01L 5/0061 (2013.01); G01N 29/04 (2013.01); G01N 29/24 (2013.01); G02B 27/281 (2013.01); *B23K 2101/006* (2018.08); *G01N 2291/0289* (2013.01); *G01N 2291/044* (2013.01); *G01N 2291/2672* (2013.01)

(58) Field of Classification Search
CPC .... B23K 2103/10; G01N 29/24; G01N 29/28; G01N 29/265; G01N 29/225; G01N 29/043; G01N 29/04; G01N 2291/0289; G01N 2291/2672; G01N 2291/267; B25J 9/1666; B25J 9/1671; B25J 9/1664; B25J 9/1682; B25J 19/023; B25J 9/1697; G01B 11/005; G02B 27/281; G01L 5/0061
USPC .......................................................... 73/588
See application file for complete search history.

(56) References Cited

U.S. PATENT DOCUMENTS

| | | | | |
|---|---|---|---|---|
| 5,906,761 A | * | 5/1999 | Gilliland | B25J 9/1671 901/42 |
| 6,643,002 B2 | * | 11/2003 | Drake, Jr. | G01S 15/8906 356/73 |
| 7,132,617 B2 | * | 11/2006 | Lee | B23K 11/24 228/103 |
| 7,395,714 B2 | | 7/2008 | Georgeson et al. | |
| 7,516,022 B2 | * | 4/2009 | Lee | G01N 3/00 702/33 |
| 7,798,002 B2 | * | 9/2010 | Tanishiki | G01N 29/043 73/620 |
| 8,146,429 B2 | * | 4/2012 | Ume | G01N 29/4481 73/622 |
| 8,627,722 B2 | * | 1/2014 | Fukuda | G01N 29/2487 73/641 |
| 8,989,897 B2 | * | 3/2015 | de Smet | G01B 11/002 901/50 |
| 9,759,540 B2 | * | 9/2017 | Ferrari | G01B 15/08 |
| 2017/0284970 A1 | | 10/2017 | Edwards, II et al. | |
| 2020/0003735 A1 | | 1/2020 | Ushijima et al. | |

FOREIGN PATENT DOCUMENTS

| | | | | | |
|---|---|---|---|---|---|
| DE | 10 2005 043 776 A1 | | 3/2007 | | |
| DE | 11 2006 000 360 T5 | | 12/2007 | | |
| DE | 112006000360 | * | 12/2012 | ............ | G01N 29/04 |
| DE | 10 2017 125 033 A1 | | 4/2019 | | |
| EP | 2 322 897 A1 | | 5/2011 | | |
| EP | 3702726 A1 | * | 9/2020 | ............ | G01B 17/02 |
| JP | 02263157 A | | 10/1990 | | |
| JP | 2007 152371 | * | 6/2007 | | |

OTHER PUBLICATIONS

DE 10 2005 043 776 A1—Espacenet English Translation.
DE 11 2006 000 360 T5—Espacenet English Translation.
DE 10 2017 125 033 A1—Espacenet English Translation.
EP 2 322 897 A1—Espacenet English Translation.
DE 101 25 782 A1—Espacenet English Translation.
DE 10 2004 044 342 A1—Espacenet Abstract.
European Search Report, dated Aug. 26, 2020, corresponding to European Application No. 20 15 8655.
German Search Report, dated Sep. 14, 2020, corresponding to German Application No. 20 2020 100 206.6.

* cited by examiner

METHOD FOR TESTING OF A WELD, AND ULTRASONIC PROBE ARRANGEMENT

This application claims priority to German Patent Application No. 10 2019 104 654.8, filed Feb. 25, 2019, and German Utility Application No. 20 2020 100 206.6, filed Jan. 16, 2020, the content of both of which are incorporated by reference herein.

The invention relates to a method for testing and/or correction of a weld, such as a spot weld, of a test object, such as a motor vehicle, or of one or more parts thereof, comprising the following method steps:
  alignment of an ultrasonic probe guided by a robot on a target position of the weld,
  determination of the actual position of the weld by means of an optical sensor, and alignment of the ultrasonic probe on the actual position, and
  measurement of the weld.

The invention also relates to an ultrasonic probe arrangement comprising an ultrasonic probe with a cover, such as a diaphragm, to be provided with a coupling medium.

DE 101 25 782 A1 indicates a method for automated ultrasonic testing of resistance spot-welded connections. This provides that after movement to a known target position of the respective resistance spot weld to be tested, in interaction with computer-controlled test signal evaluation in the robot control, programmed movement modules are activated such that a matrix of spatial positions of the ultrasonic probe, which includes with high probability an optimum position, is processed step-by-step. An evaluation of the ultrasonic signal is made between each two probe positions until a test result is obtained which is unambiguous in accordance with known criteria.

The subject matter of DE 10 2004 044 342 A1 is an arrangement and a method for automated ultrasonic testing of three-dimensionally formed beam-welded components. A five-axis joint-arm robot with a probe carrier, in which an ultrasonic probe with ultrasonic transmitter and receiver is integrated, is used for testing.

DE 11 2006 000 360 T5 discloses a method for testing of spot welds, where expected position coordinates of a spot weld are first specified to an industrial robot, the industrial robot is then positioned, and the spot weld to be tested is captured by means of an optical device. The measuring probe is then aligned on the real position coordinates of the spot weld.

To test spot welds, an industrial robot has in accordance with DE 10 2017 125 033 A1 a measuring tool with an optical device for making an image of a welded joint to be tested, and a measuring probe for testing the welded joint.

To measure workpieces, a measurement transducer extends in accordance with EP 2 322 897 A1 from a robot arm. This arm is initially moved at a first speed into a starting position, in order to then approach a measurement point at a second speed.

Non-destructive testing of spot welds is described in US 2017/0284970 A1. A phased-array ultrasonic probe is used to do so.

DE 10 2005 043 776 A1 indicates a method for positioning an ultrasonic probe, which is moved based on a camera from an estimated position into an ideal testing position.

The object underlying the present invention is to develop a method of the type described at the outset such that a weld can be tested quickly and precisely, and the results can if required be used for further welds and welded joints.

According to a further aspect, problem-free wetting of the cover of the ultrasonic sensor should be enabled in order to ensure reliable coupling to the weld to be tested.

Problem-free alignment of the probe on the weld should also be achieved without the risk of damage to the probe. The object of the swivelable probe is to permit testing of as many spot welds as possible without collision.

With regard to the method, the object is substantially achieved in that CAD data of the target position of the weld is made available, that on the basis of the CAD data of the weld the ultrasonic probe is aligned on the target position of the weld, and that the ultrasonic probe is placed on the weld with controlled force after determination of the actual position of the weld by means of the optical sensor.

In accordance with the invention, a multi-axis robot in particular is used, on which an ultrasonic probe is fastened. This is in particular a phased-array ultrasonic probe, which for example can have a matrix of 10×10 to 15×15 transmitter/receiver elements. The operating frequency can be 20 MHz. Further, a sensor, in particular an optical sensor, by means of which the weld or the spot weld is captured, is arranged in a stationary relationship to the ultrasonic probe. For testing, the ultrasonic probe is first aligned on the appropriate positions, based on the set data of the weld and particularly on the basis of CAD files, in order to then determine the actual welding position by means of the optical sensor and to subsequently align the probe on the weld in order to test it. The probe is here placed on the weld with an adaptively controlled force. To do so, the force-torque sensors of the robot are used, in order to have the ultrasonic probe act on the weld with a force P of for example P≤30 N, in particular 5 N≤P≤15 N, preferably P approximately 5 N-10 N, during measurement of the weld.

The test itself is conducted in that a coupling medium is provided, preferably water, between transmitter and receiver of the ultrasonic test sensor, and is located inside an encapsulated area of the probe. This area or housing containing the coupling medium is closed on the test object side with a cover, e.g. a diaphragm such as a film, which is wetted beforehand with a coupling fluid, such as water or oil, for measurement.

The movement of the robot is calibrated into the coordinate system of the test object, taking into account the CAD data of the test object. This means that the position of the test object relative to the robot and hence to the ultrasonic probe is determined with the incorporation of the CAD data of the test object.

Calibration can be achieved by means of one or more 2D images of a camera or 3D point cloud(s) of a 3D scanner. To do so, a best-fit is performed between the 2D/3D point cloud and the CAD model in order to capture the 6D position of the test object.

The invention therefore provides that one or more calibration bodies of known CAD data are assigned stationary to the robot, that the calibration body/bodies together with the test object or with the one or more parts of the test object are measured by means of a camera or 3D scanner, and that the position of the test object is transformed into the coordinate system of the robot with incorporation of CAD data of the test object by means of 2D images of the camera or 3D point cloud of the 3D scanner.

The ultrasonic probe is aligned on the target position of the weld on the basis of CAD data of the weld, since the robot movement has been practically calibrated into the CAD data of the test object although the robot moves in its world coordinate system.

Alignment of the ultrasonic probe on the weld is a rough orientation, i.e. the CAD data is taken into account as the starting position for the measurement. At the same time, the optical sensor, in particular in the form of a camera, is positioned at a defined distance to the surface of the test object.

A fine correction is then made to the actual spot weld position by means of the optical sensor and image processing.

The weld, in particular in the form of a spot weld, is recorded. The 2D position of the weld is determined by means of image processing. Required corrections are transmitted to the robot control in order to align the measuring probe centrally above the weld.

During the measurement itself, the ultrasonic probe should be aligned along the normal of the weld, and cantered on the weld or spot weld.

The approximate normal direction is obtained from the CAD data of the target position of the weld. Tolerances between the real component and the CAD model are corrected by means of communication with the ultrasonic probe. To do so, it is provided that based on the runtime measurements of some transmitters/receivers in the array of the ultrasonic probe, the area to be measured is captured in respect of its position and then the appropriate information is passed to the robot control in order to align the probe in the normal direction of the spot weld. In other words, the probe itself evaluates the spatial position of the spot weld in order to then align the probe in the normal direction accordingly. There is thus communication between the measurement robot and the ultrasonic testing device.

Additionally or alternatively, the normal direction can also be determined by means of the force sensor and/or torque sensor, since this determines the X, Y and Z component of the force vector. Alignment by determination of the force vector is done in particular when a correct determination by means of the ultrasonic sensors is no longer possible, e.g. due to too strong an inclination of the ultrasonic probe.

Between the individual welds, the ultrasonic test sensor should be moved at a higher speed than during the approach of a weld.

In particular, the invention provides that the welds or spot welds to be tested are pre-sorted to avoid unnecessary movements by the robot. In this way, adjacent spot welds are approached one after the other.

In other words, it is provided that during a test of several spot welds, they are pre-sorted for testing to the effect that after testing of one spot weld the one closest to the previously tested spot weld is then tested.

In a development of the invention, there is the possibility for the spot welds to be divided up into groups, the spot welds of one group being tested initially and then the spot welds of other groups one after the other.

The division into groups should be to the effect that the spacing of the spot welds in the respective group is less than the spacing between the groups.

Irrespective of this, it is in particular provided that spot welds are determined with regard to welding defects, such as spikes, and measurement of a weld having a welding defect does not take place.

It is in particular noteworthy that the captured divergences between target and actual positions of one or more welds are taken into account for the following further welds on the same or an identical test object, so that self-regulation takes place to the effect that measurements on welds can be conducted with high precision at the exact location.

In ultrasonic testing, the ultrasonic probe, which comprises at least one ultrasonic sensor and an ultrasonic inlet section such as a water inlet section, which is surrounded by or accommodated by a preferably tubular housing, must be in contact with the object to be tested. To do so requires a coupling medium, such as water or oil, to be provided between the probe and the object. It must therefore be ensured that a coupling medium can be made available to a sufficient extent.

For that reason, one of the objects of the invention is to develop an ultrasonic probe arrangement such that a coupling medium can be applied without any problem onto the cover, such as a diaphragm, associated with the ultrasonic sensor.

A further aspect provides that the area on which the probe is to be positioned can be captured optically.

To achieve the object, the invention substantially provides, among other things, that the ultrasonic test arrangement also has a metering device dispensing the coupling medium to the cover, and at least one drive device for relative movement between the cover and the metering device.

In an embodiment, it is provided that the ultrasonic probe is designed adjustable or swivelable relative to the stationarily arranged metering device, or that the ultrasonic probe is stationarily arranged and the metering device is designed adjustable or swivelable relative to the ultrasonic probe, or that both the ultrasonic probe and the metering device are designed adjustable or swivelable.

In particular, it is provided that the ultrasonic probe, comprising the at least one ultrasonic sensor, an ultrasonic inlet section surrounded by a housing, and the cover, is designed adjustable or swivelable relative to the metering device.

To facilitate problem-free alignment of the ultrasonic measuring arrangement or ultrasonic probe on an object to be tested, it is provided in a development that the arrangement comprises an optical sensor, such as a camera.

In particular, the optical sensor is directly or indirectly connected to the ultrasonic probe, and in particular the optical sensor extends from the housing of the ultrasonic probe.

The optical sensor, such as a camera, is moved synchronously with the ultrasonic probe.

Furthermore, the invention provides that the ultrasonic probe extends swivelably from a mounting.

A stationarily arranged metering device can thus be used, relative to which the ultrasonic probe is aligned.

Thanks to the swivelability, collisions with the test object can also and in particular be ruled out.

Swivelability also enables problem-free alignment of the ultrasonic probe on a measurement point such as a spot weld.

In particular, the invention provides that the metering device is arranged relative to or is connected to the mounting such that the spray jet longitudinal axis is along the longitudinal axis of the mounting, and that the ultrasonic probe is swivelable about an axis vertical to the mounting's longitudinal axis such that in a swiveled position the longitudinal axis of the ultrasonic probe is along the spray jet longitudinal axis, the cover extending on the spray jet side.

It is provided in accordance with an independently inventive measure that the optical sensor arranged stationary relative to the ultrasonic probe is shielded at least in the area of the jet entry side from the ultrasonic probe when the latter is aligned on the spray jet of the metering device.

In particular, the distal area of the optical sensor or its housing is at a distance to the ultrasonic probe. In the free space thus created, a shielding element extends between the ultrasonic probe and the optical sensor, when the cover, such as a diaphragm, is aligned in the spray jet direction.

The shielding element can extend here from the mounting or be arranged stationary thereto.

To permit an evaluation of the weld or spot welds, the invention provides that the lens system of the optical sensor has two polarization filters rotatable relative to one another.

A test of the reflections can therefore be conducted to ascertain the extent to which welds are defective in their surface structure or have peripheral geometries that must be ruled out as welds to be tested.

Further details, advantages and features of the invention can be gathered not only from the claims and in the features to be found therein—singly and/or in combination—but also from the below description of preferred embodiments.

Using ultrasound, welds can be tested on a test object, such as a motor vehicle or parts thereof.

These welds are for example spot welds, which are generated in particular by resistance welding, which is a widespread technology for firmly connecting two or more metal parts, mostly sheets or plates of steel or aluminum. The production of car bodies is noteworthy in particular, resistance welding being an important joining method. Testing in accordance with the invention of welds or spot welds is however not restricted to this: other fields of sheet metal processing or joining of sheets, for example in household appliances, are also conceivable. The metal parts are connected here using several smaller, circular welds, i.e. spot welds. To ensure the quality of the connections, appropriate spot welds have to be tested. Since however it is not certain that the welds are always made at the specified positions, or target positions, testing at the target positions cannot provide reliable conclusions as to the quality of the welds. A test must instead be conducted at the actual welding position. This can be done non-destructively with an ultrasonic test sensor, with the ultrasonic pulse-echo method, i.e. the reflexion sound method, being usable. This requires a coupling medium, which is usually water, to be present between the transmitter and receiver. The principle of this is explained in the following.

To determine the quality of the weld, it is therefore necessary to capture the actual position of the weld in order to then conduct a test. The principle of this is explained in the following.

Figure 1:
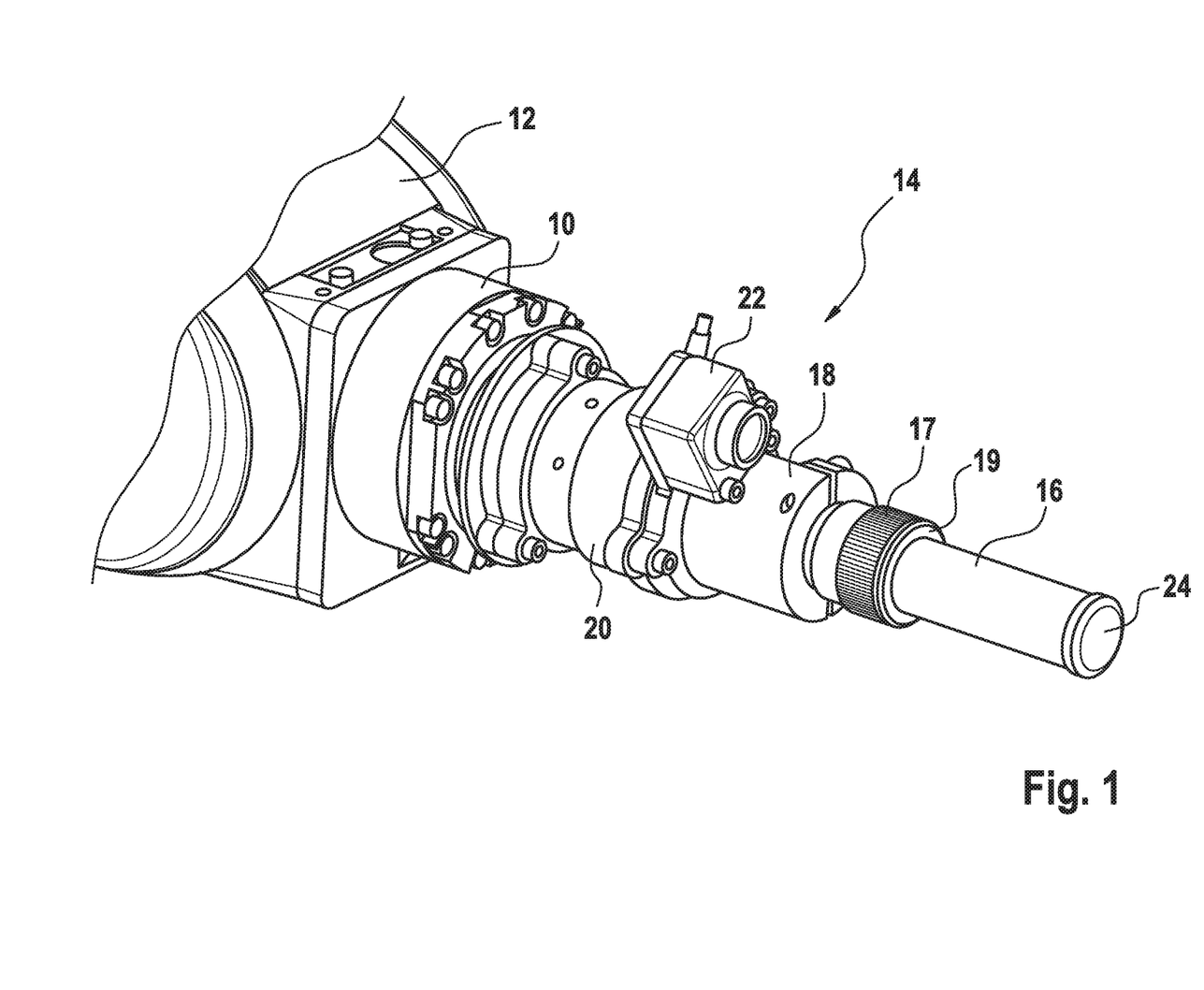
FIG. 1 a section of a robot arm with ultrasonic probe.

In accordance with the invention, the weld is tested using a robot. To do so, a probe 14 can be fastened to the flange 10 of an arm 12 of a multiple-axis robot, having an ultrasonic probe 16 with water inlet section, which in the example is connected using an adapter 18 to a force-torque sensor 20 which is in turn connected to the flange 10 via fastening elements not identified in detail. An optical sensor in the form of a camera 22 is provided in a stationary relationship to the ultrasonic measuring probe 16 and extends for example from a mounting arranged between the adapter 18 and the force sensor 20.

The probe 16 itself is preferably designed as a phased-array ultrasonic probe and has a matrix of transmitters/receivers, for example a matrix of 10×10 to 15×15 transmitter/receivers is noteworthy. The coupling of the probe 16 to the test object is achieved by a water inlet section, preferably in the proven bubbler technology.

The actual position of a weld can be determined by means of the optical sensor 22, in particular in the form of the camera, in order to then align the ultrasonic measuring probe 16 on the actual position and place it on the weld. Here a diaphragm 24 closing the water inlet section in the ultrasonic measuring probe 16 on the test object side is placed on the test object with a force in the range of preferably 5-10 N. Placing is adaptive and with controlled force, with the assistance of the force-torque sensors of the robot. Furthermore, there is an alignment of the probe 16 on the weld such that a force of the probe acts on the weld in its normal direction.

The normal direction is achieved here in particular by communication between the ultrasonic probe 16 and the robot control. The position of the area to be measured is determined by means of runtime measurements of at least some, preferably four, sensors of the phased-array ultrasonic probe. After the position has been determined, the normal can then be determined and the probe can be aligned accordingly by the robot control so that its longitudinal axis is along the normal direction of the spot weld. In particular, the longitudinal axis of the probe 14 is aligned on the normal extending from the central area of the spot weld.

The ultrasonic probe 16 is screwed to the adapter 18 (screw connection 17). Furthermore, a silicone layer 19 can be provided on the measuring probe side as collision protection. The effect of this is in particular that an obstacle is not contacted too hard, so that deceleration or evasion is possible without the ultrasonic probe 16 being damaged.

In the case of a possible collision of the ultrasonic probe 16 with the test object, such as sheet metal panels, during movement to a spot weld, a minimum evasive movement can be introduced, so that the probe 16 is still placed as centrally as possible on the spot weld.

Figure 2:
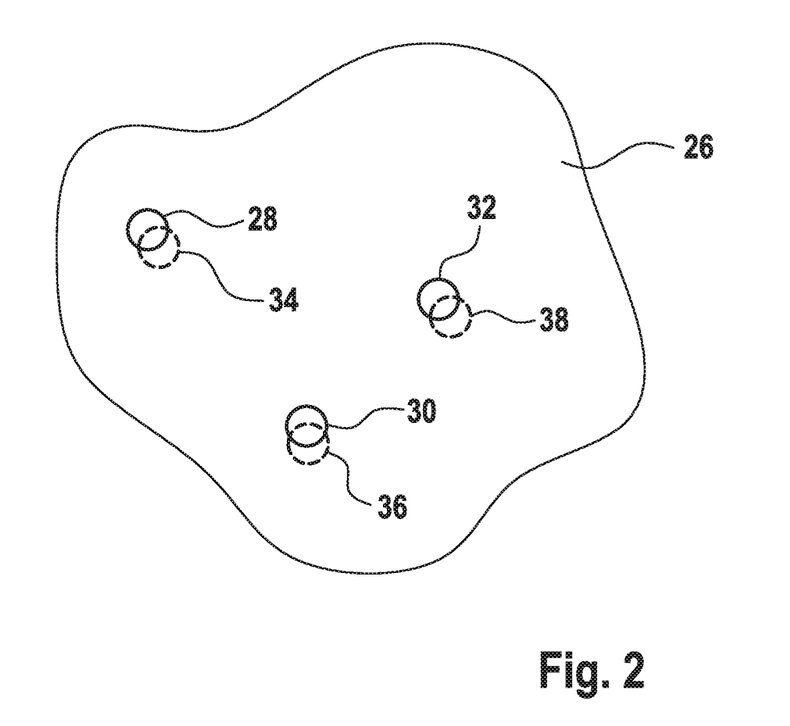
FIG. 2 a section of a test object.

Referring to FIG. 2, the principle of the measurement method will be explained. FIG. 2 shows a section 26 of a test object which is welded for example at some points to an object (not shown). The appropriate spot welds are available as CAD data and are symbolized in FIG. 2 by full circles 28, 30, 32.

In practice, the position of the actual spot welds 34, 36, 38 does not always match the target spot welds 28, 30, 32, as the dashed circles 34, 36, 38 are intended to make clear. However, to non-destructively measure the quality of the spot welds 34, 36, 38 with precise positions, it is necessary for the ultrasonic sensor 16 to be aligned on the actual spot welds, and then be placed on them with the necessary force to conduct a proper measurement. To do so, the position of the actual spot weld 34, 36, 38 is determined by means of the camera and image processing, and its normal direction by means of runtime measurements. Alternatively or additionally, the force vector can be determined by means of the force-torque sensors, and by adjustment of the probe it can be aligned along the normal.

In accordance with the invention, it is provided that after calibration of the robot onto the coordinate system of the test object, the ultrasonic sensor 16 is first aligned on the target spot welds 28 or 30 or 32, which are obtained for example from CAD data. After alignment on the target spot weld, the actual spot weld is optically captured by means of the camera 22 and its coordinates are determined. To do so, an image processing algorithm can determine the 2D centerpoint of the actual spot weld and transmit it to the measurement robot. If there is a divergence between target and actual value, the robot arm 12 is adjusted accordingly, so that the ultrasonic sensor 16 is aligned on the actual spot weld 34 or 36 or 38 and can measure it.

The appropriate divergences can also be used to make corrections for further welds on the same or on a corresponding test object, in order to achieve a better match of target and actual spot welds. To that extent, a correction is made of the position at which welding is to take place.

Alternatively or additionally, measurement results, differences determined between actual and target positions of the welds or spot welds, can be filed in a client database and/or in a CAD model containing the target positions of the welds.

While referring to FIG. 1 an ultrasonic probe arrangement for testing welds in the form of spot welds was explained purely in principle, FIGS. 3 to 7 show a preferred embodiment of an ultrasonic probe arrangement 104 and further features distinguishing the invention, singly and/or in combination.

Figure 3:
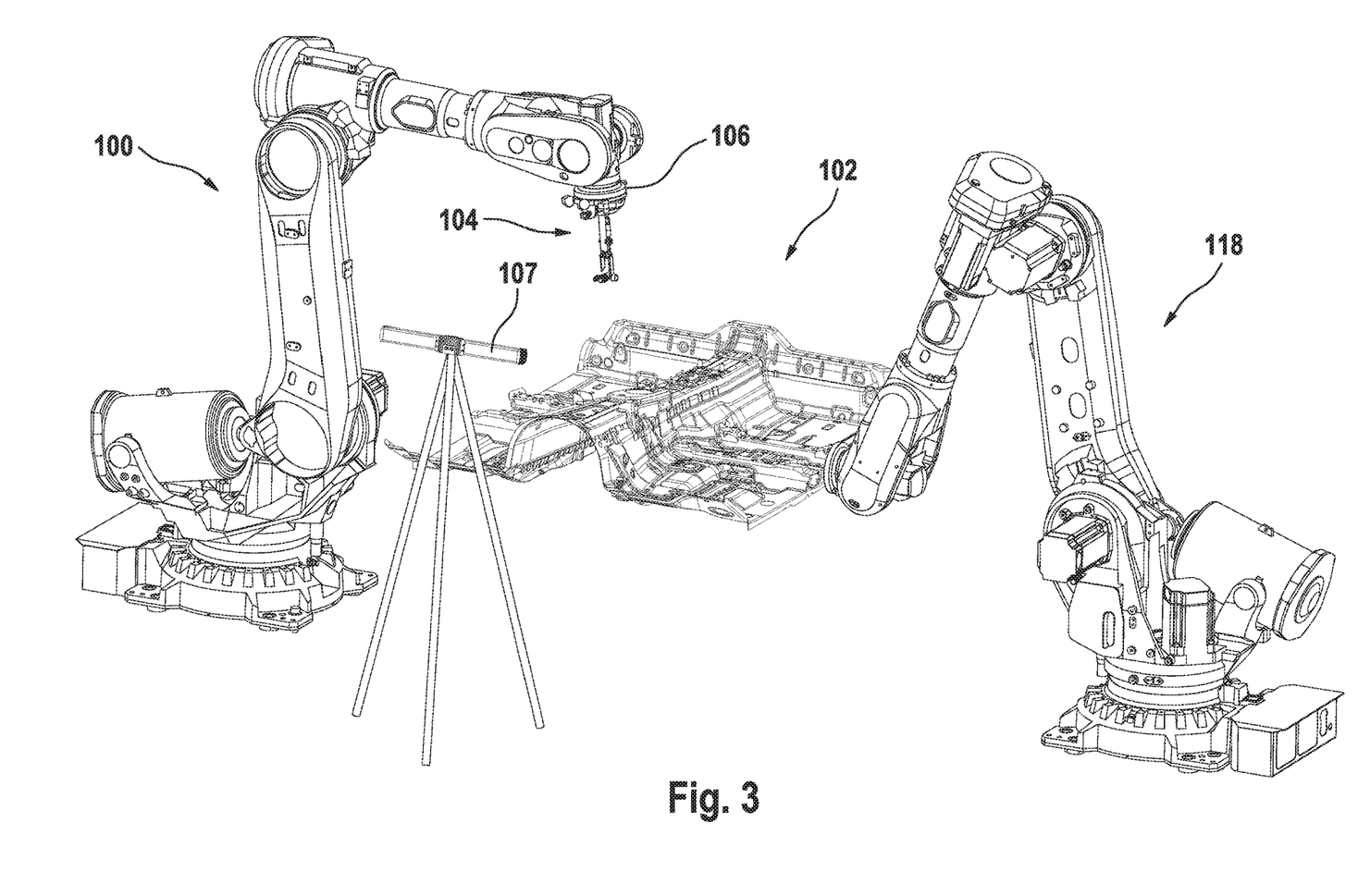
FIG. 3 an arrangement for measurement and testing of welds.

Referring to FIG. 3, the calibration of a robot 100 in order to test welds on a test object 102 for which CAD data is available will be explained in principle. Without restricting the invention, the welds are generally referred to in the following as spot welds.

To determine the spatial position of the test object 102 in relation to the robot 100 and hence to an ultrasonic probe arrangement 104 fastened to an end flange 106 of the robot, i.e. to calibrate the robot 100, both the test object 102 and the calibration bodies 108, 110, 112 are captured by means of a 3D scanner 107 in order to enable transformation of the spatial coordinates of the test object 102 from the 3D point cloud(s) of the 3D scanner 107 into the coordinate system of the robot 100, the CAD data of the test object 102 and of the calibration bodies 108, 110, 112 being incorporated at the same time. The CAD data of the calibration bodies 108, 110, 112 is known. The spatial coordinates in the robot coordinate system are also available.

The calibration bodies 108, 110, 112 extend from a mounting 113 which is part of the ultrasonic probe arrangement 104 connected to the flange 106 of the robot 100. The probe arrangement 104 can therefore be moved towards the test object 102 on the basis of the CAD data of the latter.

The mounting with the calibration bodies can be removed after completion of calibration, so that the mass to be moved during measurement or testing of the spot welds by means of the robot is reduced.

To ensure that the operating range of the robot 100 can reach all areas of the test object 102 to be tested, the test object 102 is preferably held and fixed by a second robot 118 and can thus be aligned relative to the first robot 100 such that the measurements can be conducted.

It is furthermore provided that the data of the 3D point cloud and the CAD data are incorporated according to the best-fit method.

The 3D point cloud obtained in this way is compared with the CAD data and the component position is ascertained.

Accordingly, the CAD data available in a format independent of the component position is converted into absolute robot positions, the 3D scanner being used.

With these measures, the coordinates of the test object and its spatial position relative to the robot 100 are available. The 6D data in the component coordinate system are exported into the world coordinate system of the robot and are available there.

Figure 4:
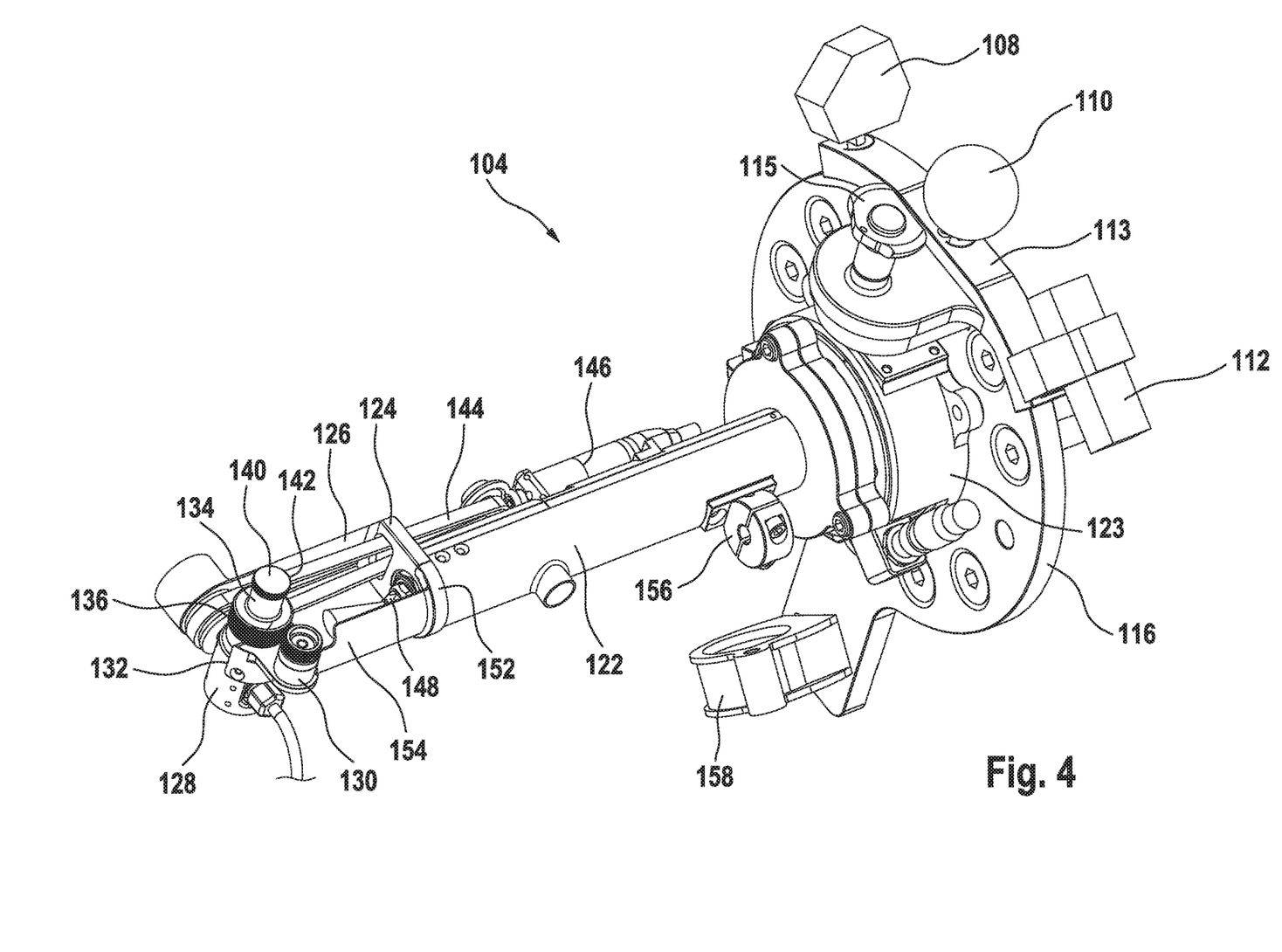
FIG. 4 a first representation of an ultrasonic probe arrangement.
Figure 5:
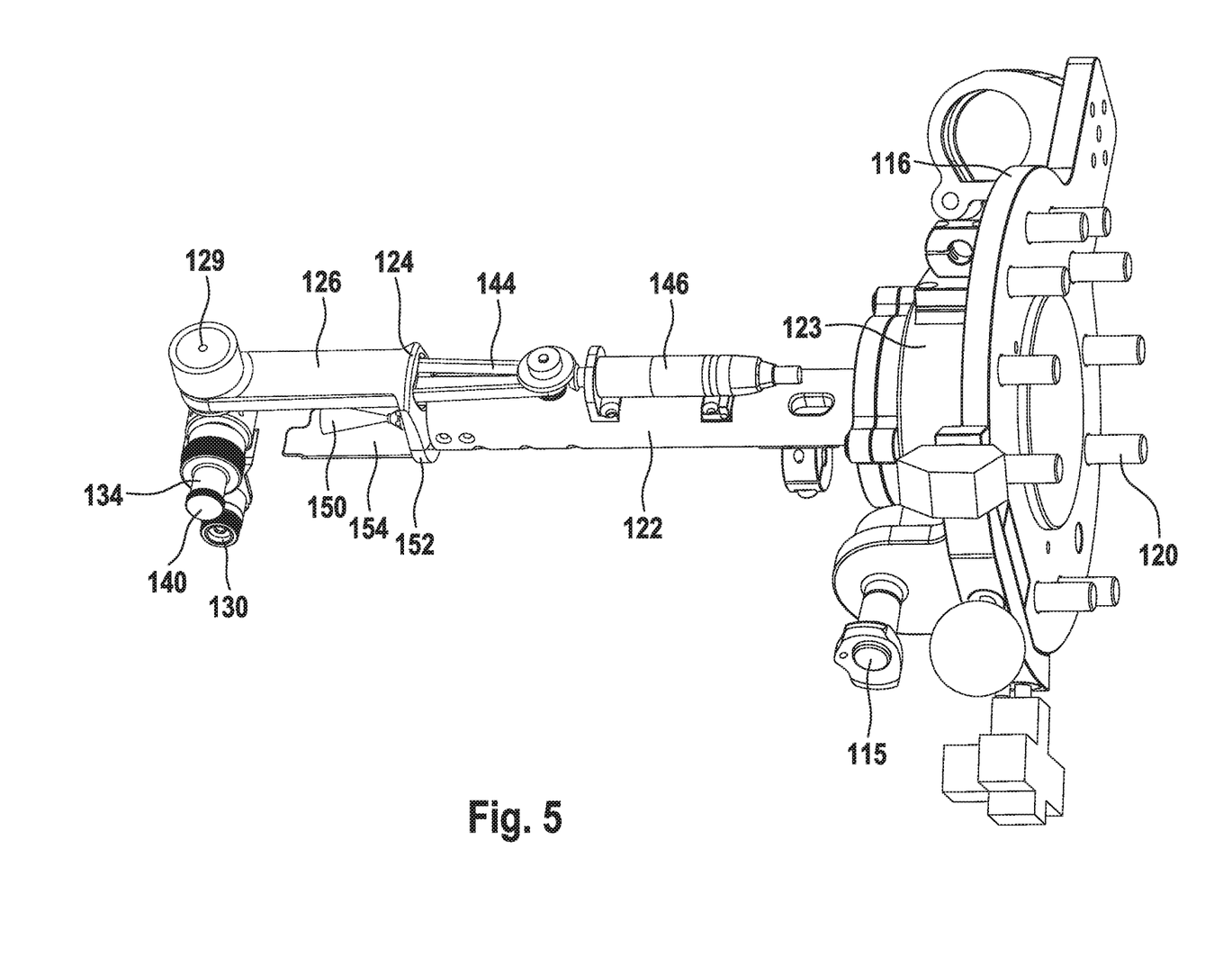
FIG. 5 the ultrasonic probe arrangement according to FIG. 4 in a different position, FIG. 6A first swivel position of an ultrasonic probe, FIG. 6B second swivel position of an ultrasonic probe, FIG. 6C third swivel position of an ultrasonic probe, and FIG. 7 a detailed representation of an ultrasonic probe without camera.

The probe arrangement 104 is shown in greater detail in FIGS. 4 and 5.

One the one hand the mounting 113 for the calibration bodies 108, 110, 112, and on the other hand a carrier 122 connected via a force-torque sensor 123 to the base plate or flange plate 116, extend from said plate 116, which is connectable in a clear spatial relationship to the robot 100 using centering pins 120.

The carrier 122 has in its distal area a mounting 124, which in the design example has an L-shaped geometry with one side 126 in the longitudinal axis direction of the carrier 122 which rotatably holds an ultrasonic probe 128 with camera 130. The camera 130 is here rigidly connected to the housing 132 of the ultrasonic probe 128, so that a synchronous movement is achieved of the ultrasonic probe 128 and the camera 130, which can be surrounded on the jet entry side by annular lighting.

The calibration bodies 108, 110, 112 with the mounting 113 are connectable stationary to the flange 116 using a locking bolt 115, as the drawing makes clear in self-explanatory manner.

The ultrasonic probe 128 can be a phased-array probe.

The probe 128 has in the usual way a water inlet section surrounded by a housing 134. To permit the use of inlet sections of differing lengths, the housing 134 is detachably connected to the housing 132 of the ultrasonic probe 128, e.g. with a knurled nut 136. The housing 134 of the inlet section has distally a cover, such as a diaphragm 140, which during measurement of a spot weld is placed thereon. The diaphragm 140 can in turn also be replaced, e.g. by means of the knurled nut 142.

To permit swiveling of the ultrasonic probe 128 and hence of the camera 130, a transmission drive is provided. A belt 144 is adjusted here by an actuator 146.

The belt 144 is passed through a deflecting pulley, not identified in detail, whose axis defines the swivel axis 129 of the ultrasonic probe 128.

Furthermore, a metering device is integrated in the carrier 122 and has an outlet nozzle 148 via which a wetting fluid can be dispensed to permit wetting of the diaphragm 140. The wetting medium, such as water or oil, is sprayed conically from the nozzle 148, the longitudinal axis of the cone 150 coinciding with or parallel to the longitudinal axis of the carrier 122. The swivel/rotation axis 129 of the ultrasonic probe 128 is vertical thereto, as shown in the drawings.

Furthermore, a shielding plate 154 extends from the transverse side 152 of the mounting 20 connected to the carrier 122 and is dimensioned such that when the ultrasonic probe 128 and hence the diaphragm 140 are aligned on the spray cone 150 of the metering device with the nozzle 148, the camera 130, i.e. its inlet lens system, is shielded such that it cannot be sprayed on.

The connections leading to the ultrasonic probe 128, the camera 130 and the actuator 146 are held by cable guides 156, 158 which also provide strain relief.

Figure 6A:
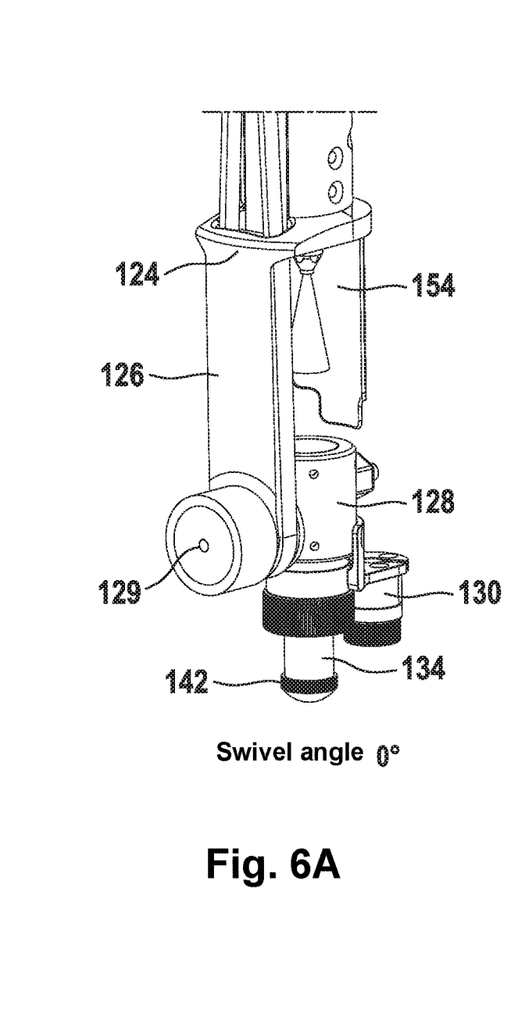
Figure 6B:
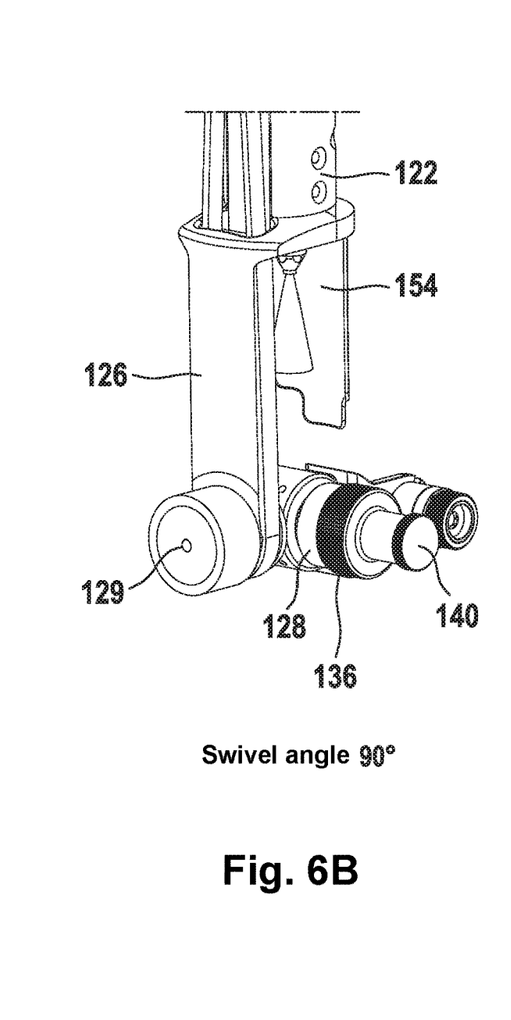
Figure 6C:
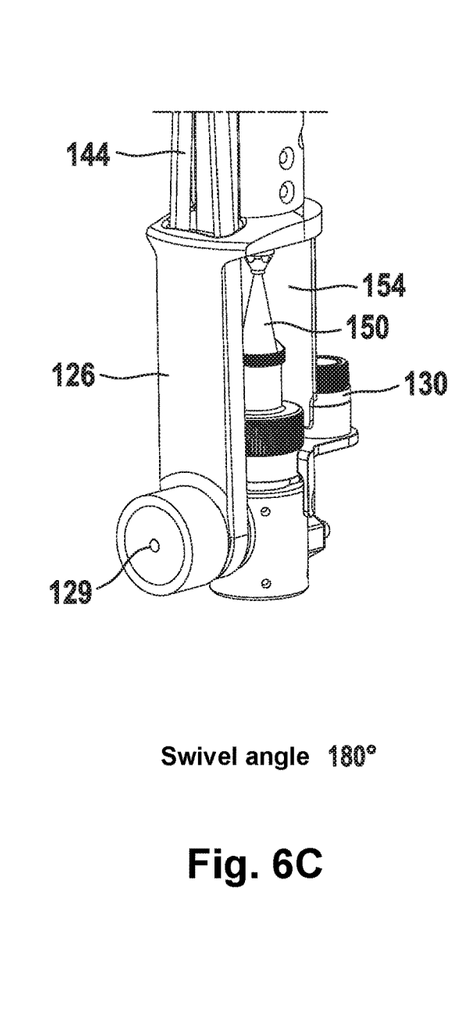

Referring to FIG. 6, it is once again illustrated that the ultrasonic probe 128, and synchronously therewith the camera 130, can be swiveled relative to the mounting 124 and hence to the base plate 116. In the representation a) the swivel angle is 0°, in the representation b) the swivel angle is 90° and in the representation c) the swivel angle is 180°, in which the diaphragm 140 is aligned on the spray cone 150 to be wetted.

At the same time, the separating plate 154 between the camera 130 and the spray cone 150 is discernable, such that wetting of the lens system of the camera 130 is ruled out.

Between the positions of the ultrasonic probe 128 presented in FIG. 6, any other position can be assumed, enabling an optimum alignment of the ultrasonic probe 128 on a spot weld and hence allowing collisions with the test object 102 to be avoided. Additionally, the robot arm 100 can rotate at a fixed swivel angle about the axis of the ultrasonic probe 128 in order to avoid collisions. Overall, the result is thus two degrees of angular freedom for collision-free placing of the ultrasonic probe onto a spot weld, namely the swivel angle and the rotation angle about the axis of the ultrasonic probe.

To test a spot weld using the arrangement in accordance with the invention, the probe 128 is firstly roughly set on the basis the CAD data of the spot welds, which have been transformed in the manner described previously into the coordinates of the robot 100.

From this target position, the probe 128, i.e. the member of the robot 100 holding the probe arrangement 104 or its arms, is moved on the basis of the image taken by the camera 130 and of the image processing by means of the software processing this data, in order to then place the ultrasonic probe 128 in the normal direction on the spot weld as the actual position after determination of the normal extending from the center point of the spot weld.

In particular, the normal direction is determined by means of four sensors. Should this not be possible, the force-torque sensor 123 is used. Regardless of this, both the ultrasonic sensors and the force-torque sensor 123 may be taken into account for determination of the normal, so that redundancy is assured.

Furthermore, it is ensured by means of the force-torque sensor 123 that any collisions are immediately detected and hence a movement of the probe 128 away from the collision area can take place immediately.

Thanks to communication between the ultrasonic probe 128 and the test object 102 or spot weld, an alignment along the normal is ensured during measurement or testing.

Prior to measurement, the diaphragm 140 can be sprayed by means of the metering device.

For an optimum alignment while at the same time ruling out a collision with areas of the test object, the probe 128 can be swiveled in accordance with the invention.

The target/actual offset of the spot weld can be stored.

Since the diaphragm 140 is wetted, no wetting of the test object is required.

The diaphragm 140 is preferably wetted prior to every measurement.

Since several spot welds generally have to be tested, pre-sorting takes place to avoid unnecessary movements. In this way, adjacent spot welds are approached one after the other. There is also the possibility of conducting pre-sorting to the effect that spot welds are split into groups, which are approached one after the other to test the spot welds within them.

Further advantages, as explained in the following, result from camera image processing.

Not only spot welds are detected, but harmful features too are determined.

For example, it can be ascertained in a first step whether a spot weld has been captured at all, or only the pure test object material.

If it is found that a spot weld does not exist in reality, but has been filed in the CAD model, an error message is generated to update the database. Alternatively, a spot weld can be created by means of a robot.

The 2D positions of several spot welds can be detected in the image in order to determine the spot weld which is closest to the center of the image.

For the detection of the spot welds, the procedure is as follows:

Several pattern of actually existing spot welds can be filed in the software as teaching images with associated search radii for pattern generation. These search patterns are used at the same time for the pattern search. The number of spot welds to be searched for can be freely set.

It is important here that more than just one spot weld is searched for in the image, since in practice several spot welds can be located close to one another.

If a spot weld is detected, it is examined as to whether a spike is present. Should this be the case, the spot weld is not approached, since otherwise the diaphragm of the ultrasonic probe might be damaged. An error message may be issued.

If an acceptable spot weld is ascertained, a concluding safety test can be conducted as to whether the suggested correction, i.e. a position change for alignment on the actual spot weld based on image processing, is smaller than a settable limit, in order to avoid unwanted collisions in the case of implausible correction values.

Finally, the robot approaches the spot weld in a single movement at a safe distance to the surface, so that the ultrasonic probe is aligned centrally and at a defined distance to the spot weld. Then the diaphragm is placed on the spot weld and measurement takes place.

Figure 7:
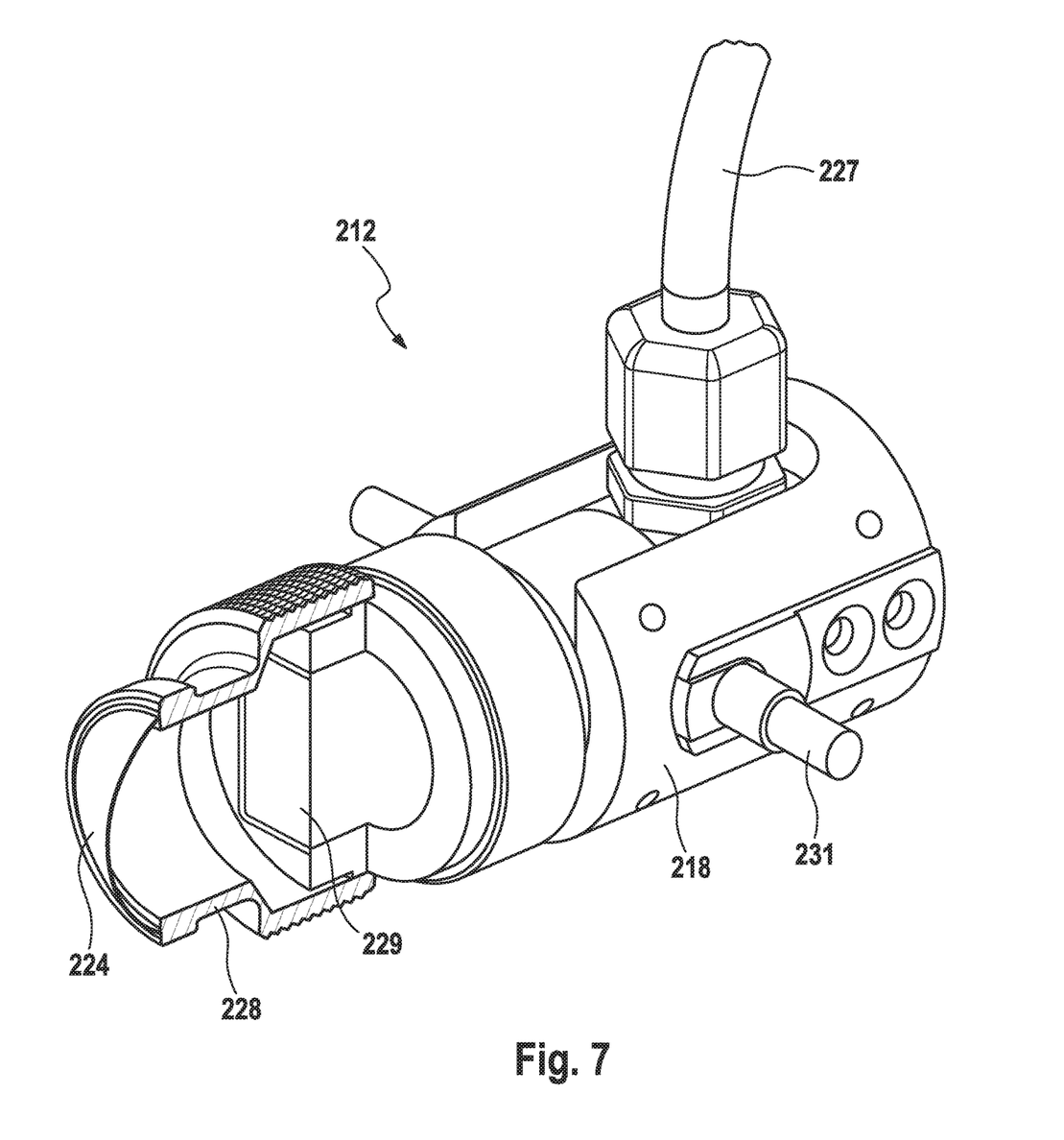

FIG. 7 shows purely in principle an ultrasonic probe 212 having a housing 228 comprising an inlet section, a diaphragm 224, and ultrasonic sensors 229 provided in a housing 218 or connected to the housing 218 and which are connected to an electronic unit via a connection (cable 227) in order to emit ultrasonic pulses and to receive and then evaluate reflected ultrasonic pulses.

Also, a rotary axis 231 is shown purely in principle that passes through the mounting 124 to allow the probe 212 to be swiveled by means of the drive 144, 146 to the extent previously set forth.

Substantial features of the invention are that the ultrasonic probe and the optical sensor are synchronously swivelable, an alignment on a metering device being achieved by means of which a coupling medium can be sprayed onto the cover of the ultrasonic probe.

Also independently inventive is the determination of the spatial position of the test object having the welds to be measured relative to the robot having the ultrasonic probe, the CAD data of the test object and of the welds being transformed into absolute robot positions, in particular using a 3D scanner with which the positions inside the space of both the test object and the calibration bodies associated with that part of the robot holding the ultrasonic probe arrangement are determined and of which the CAD data are known.

Also inventive is the rough alignment of the ultrasonic probe on the welds on the basis of the exported CAD data of the welds, and subsequent fine alignment by means of the optical sensor and image processing, and the placing of the ultrasonic probe on the weld, such as a spot weld, in the normal direction.

Also noteworthy is the determination of the normal direction by runtime measurements of the ultrasonic measuring field of the ultrasonic probe and/or the alternative or redundant determination of the normal by determining the X, Y, Z components of the force vector when the ultrasonic probe is placed on the spot weld.

Pre-sorting of the spot welds to be tested, and if necessary the division of the spot welds into groups and successive testing of the welds in the groups, are also noteworthy.

Further noteworthy features are:

placing of the ultrasonic probe on the spot weld with a defined force preferably between 5 N and 10 N, determination of welding defects, such as spikes, which could lead to damage of the ultrasonic probe or its cover, making of welds when absence of welds is detected.

What is claimed is:

1. A method for testing a weld of a test object, or of a portion thereof, comprising:
    obtaining CAD data on a target position of the weld,
    aligning an ultrasonic probe on the target position of the weld based on the CAD data using a first robot,
    determining an actual position of the weld using an optical sensor,
    aligning the ultrasonic probe on the actual position of the weld,
    positioning the ultrasonic probe on the weld using a controlled force, and
    measuring a quality of the weld.

2. The method according to claim 1, comprising assigning at least one calibration body of known CAD data stationary to the first robot,
    measuring the calibration body and the test object using a camera or a 3D scanner,
    determining a position of the test object using 2D images obtained by the camera, or a 3D point cloud obtained by the 3D scanner, and
    transforming the position of the test object into the coordinate system of the first robot based on CAD data of the test object.

3. The method according to claim 1, comprising placing the ultrasonic probe in a normal direction of the weld wherein the ultrasonic probe acts on the weld with a force P,
    wherein P≤N, or 5 N≤P≤15 N, or P is approximately 5 N-10 N, during measurement of the weld.

4. The method according to claim 1, comprising at least one of:
    determining a normal direction of the weld using an ultrasonic sensor of the ultrasonic probe, and
    determining a direction of a vector of a force acting on the weld using at least one of force sensor and a torque sensor.

5. The method according to claim 1, comprising pre-sorting a plurality of welds for testing,
    testing a first one of the plurality of welds, and then
    testing a second one of the plurality of welds that is closest to the first one of the plurality of welds.

6. The method according to claim 1, comprising selecting a plurality of welds for testing, and
    dividing the plurality of welds into a plurality of groups,
    wherein a spacing between a plurality of welds in a group of the plurality of groups is less than a spacing between the plurality of groups.

7. The method according to claim 1, comprising selecting a plurality of welds for testing, and
    holding the test object with a second robot (118),
    wherein the first robot reaches at least all welds of the plurality of welds.

8. The method according to claim 1, comprising determining a welding defect in the weld, without measuring the weld having the defect.

9. The method according to claim 1, wherein the ultrasonic probe is swivelable relative to the first robot, and wherein collisions with the test object are avoided by swiveling the ultrasonic probe.

10. The method according to claim 1, comprising connecting the ultrasonic probe to the optical sensor so that the ultrasonic probe and the optical sensor are synchronously swivelable relative to each other.

11. An ultrasonic probe arrangement, comprising:
    a carrier;
    an ultrasonic probe having a cover, said ultrasonic probe being connected to the carrier;
    a metering device associated with the carrier and located proximate to the ultrasonic probe, said metering device being configured to dispense a coupling medium to the cover, and
    a drive device connected to the carrier and the ultrasonic probe, said drive device being configured to provide relative movement between the cover and the metering device.

12. The ultrasonic probe arrangement according to claim 11,
    wherein the ultrasonic probe is adjustable relative to the metering device when the metering device is configured to be in a stationary position; or
    wherein the ultrasonic probe is arranged in a stationary position relative to the metering device when the metering device is configured to be adjustable; or
    wherein the ultrasonic probe and the metering device are configured to be adjustable relative to each other.

13. The ultrasonic probe arrangement according to claim 11, wherein the metering device comprises a nozzle configured to spray a conically-shaped jet of the coupling medium.

14. The ultrasonic probe arrangement according to claim 11, comprising a base element that is connectable to a robot, or to an arm of the robot.

15. The ultrasonic probe arrangement according to claim 11, further comprising an optical sensor arranged stationary relative to the ultrasonic probe.

16. The ultrasonic arrangement according to claim 15, wherein the optical sensor is surrounded by annular lighting.

17. The ultrasonic probe arrangement according to claim 15, wherein the optical sensor has an optical axis extending along a longitudinal axis of the ultrasonic probe.

18. The ultrasonic probe arrangement according to claim 11, wherein the ultrasonic probe extends swivelably from a mounting.

19. The ultrasonic probe arrangement according to claim 18, wherein the metering device is arranged stationary to the mounting, or integrated therein, and the ultrasonic probe is aligned relative to the metering device.

20. The ultrasonic probe arrangement according to claim 11, wherein the metering device is arranged relative to, or connected to, the mounting so that a longitudinal axis of the spray jet extends along the longitudinal axis of the mounting, and the ultrasonic probe is swivelable about an axis vertical to the longitudinal axis of the mounting, wherein in a swiveled position, the longitudinal axis of the ultrasonic probe extends along the spray jet longitudinal axis, and the cover extends on the spray jet side.

21. The ultrasonic probe arrangement according to claim 11, wherein an optical axis of the optical sensor extends along the longitudinal axis of the ultrasonic probe, and wherein the optical sensor is shielded, at least in the area of the jet entry side, from the ultrasonic probe when the ultrasonic probe is aligned on the spray jet of the metering device.

22. The ultrasonic probe arrangement according to claim 21, wherein a shielding element extends in a space between a distal area of the optical sensor, or a housing of the optical sensor,
when the cover of the ultrasonic probe is aligned in a direction of the spray jet.

23. The ultrasonic probe arrangement according to claim 22, wherein the shielding element extends from the mounting, or is arranged stationary relative to the mounting.

24. The ultrasonic probe arrangement according to claim 15, wherein the optical sensor has a lens system comprising two polarization filters that are rotatable relative to one another.

\* \* \* \* \*